J. R. GLEESON.
INSECT GUARD.
APPLICATION FILED SEPT. 3, 1918.

1,335,230.  Patented Mar. 30, 1920.

INVENTOR
JOHN R. GLEESON
BY
Baldwin Vale
ATTORNEY

UNITED STATES PATENT OFFICE.

JOHN R. GLEESON, OF STOCKTON, CALIFORNIA.

INSECT-GUARD.

1,335,230.     Specification of Letters Patent.     Patented Mar. 30, 1920.

Application filed September 3, 1918. Serial No. 252,321.

*To all whom it may concern:*

Be it known that I, JOHN R. GLEESON, a citizen of the United States, and a resident of the city of Stockton, county of San Joaquin, State of California, have made a new and useful invention—to wit, Improvements in Insect-Guards; and I do hereby declare the following to be a full, clear, concise, and exact description of the same.

The present invention is an improved collapsible insect guard. One object of the invention is to provide an article of manufacture of such structure that it can be made of inexpensive stock materials and which when assembled will be collapsible into a very small space for storage and which is extensible and self supporting when extended to form a frame for a screen to exclude insects.

A further object of the invention is to provide an insect guard which is adaptable to various household uses and may be used in the protection of foodstuffs and which also has features which render it especially applicable to the use of sleeping persons as a means of protection against nocturnal depredation of mosquitoes and other obnoxious insects.

In this specification and the annexed drawings, the invention is illustrated in the form considered to be the best, but it is to be understood that the invention is not limited to such form because it may be embodied in other forms, and it is also to be understood that in and by the claim following the description it is desired to cover the invention in whatever form it may be embodied.

Figure 1:
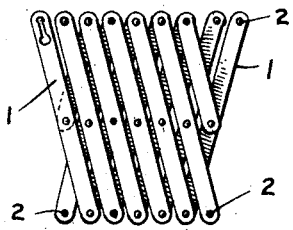
Figure 1 is a side elevation of my improved insect guard in collapsed position.
Figure 2:
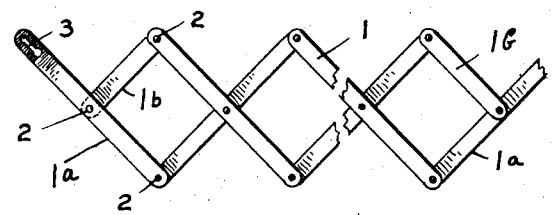
Fig. 2 is the same in extended relation.

In detail the construction illustrated in the drawing includes a series of flat strips 1 of metal or any suitable material which are provided with holes at each end and in the center to engage pivot pins 2.

Figure 3:
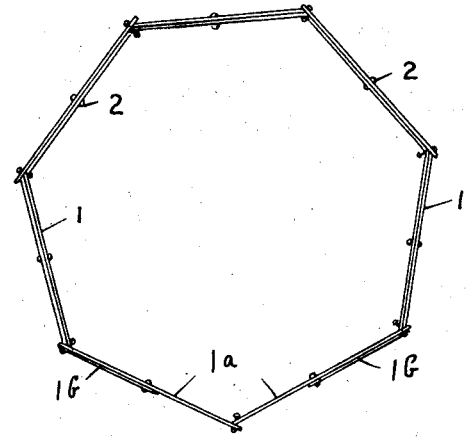
Fig. 3 is a plan view showing the guard joined in end to end relation.
Figure 4:
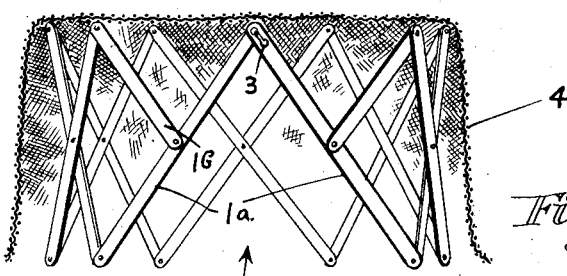
Fig. 4 is a side elevation of Fig. 3.

The pivot pins 2 are loosely secured in the respective holes to allow the strips 1 when joined in the lazy tong relation to be flexed to the circular position shown in Figs. 3 and 4.

The strip $1^a$ at one end of the guard is provided with a keyhole slot 3 to engage the pivot pin $2^a$ when the guard is in the position shown in Figs. 3 and 4 and form a self supporting structure for holding a suitable net or fabric 4 to exclude insects.

At each end of the lazy tong structure and pivotally secured to the strips $1^a$ at the center are two similar strips $1^b$ of substantially half the length of the strip 1.

Figure 5:
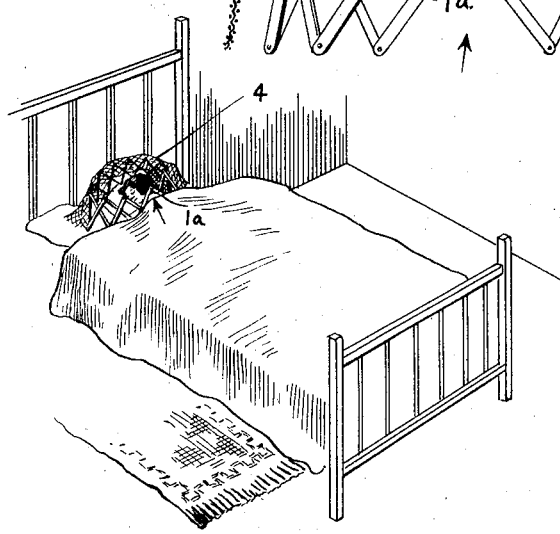
Fig. 5 is a perspective view showing my invention in use as a protection for a sleeper.

The purpose of this construction is to form a vertical V-shaped opening as indicated by the arrow in Figs. 4 and 5 adapted to clear the neck or shoulders of a sleeper when the guard is used as shown in Fig. 5.

Having thus described this invention, what I claim and desire to secure by Letters Patent is:

An insect guard including a frame comprising a series of strips pivoted together in "lazy tongs" relation and adapted to be flexed laterally into the form of a circle; and means for detachably engaging together the last strips in said series to leave an opening therebetween for the head of the user; and a net inclosing said frame.

In testimony whereof, I have hereunto set my hand at San Francisco, California, this 22d day of August 1918.

JOHN R. GLEESON.

In presence of—
    A. J. HENRY,
    BALDWIN VALE.